June 29, 1937. H. A. RICHARDSON 2,085,201
COMBUSTION CONTROL IN FURNACES
Filed Oct. 18, 1934 2 Sheets-Sheet 1
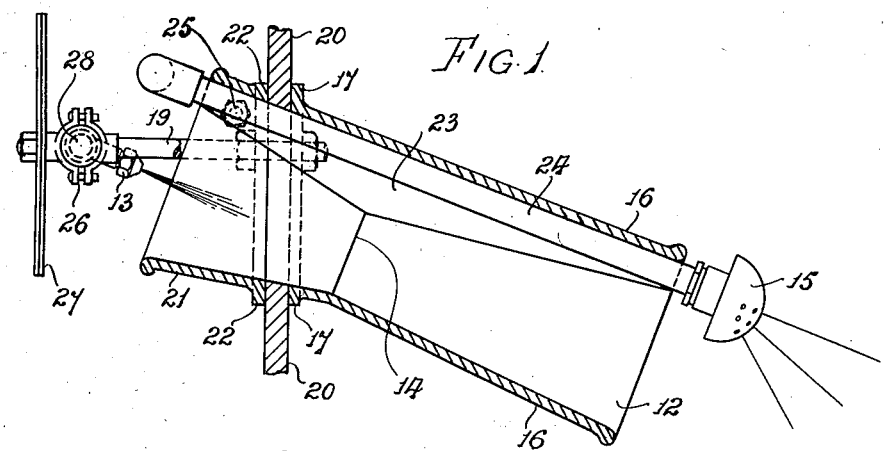
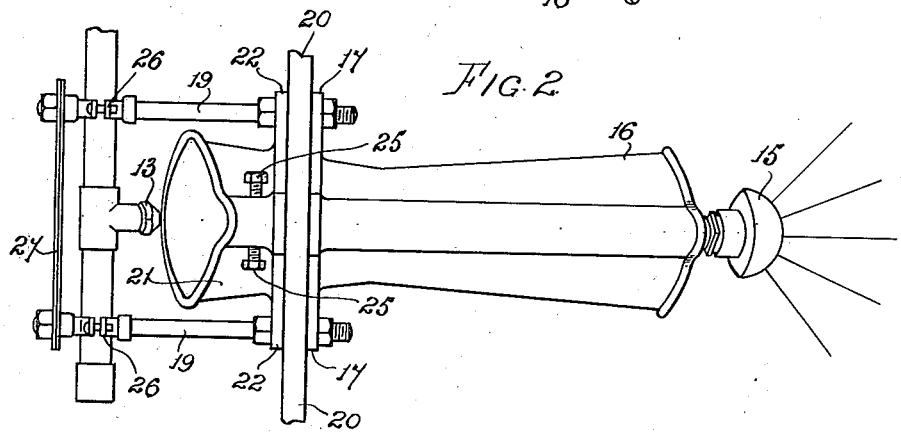
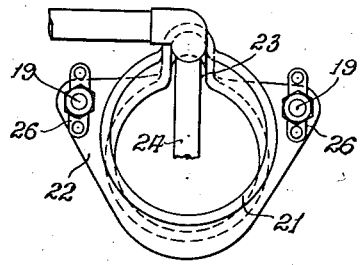
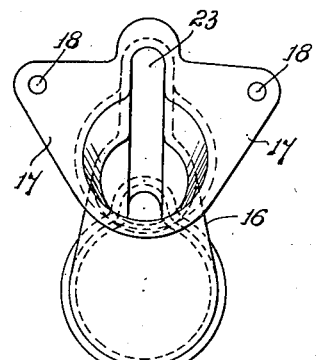
Harold Ashton Richardson
INVENTOR
Watson, Bristol, Johnson & Leavenworth
ATTORNEYS

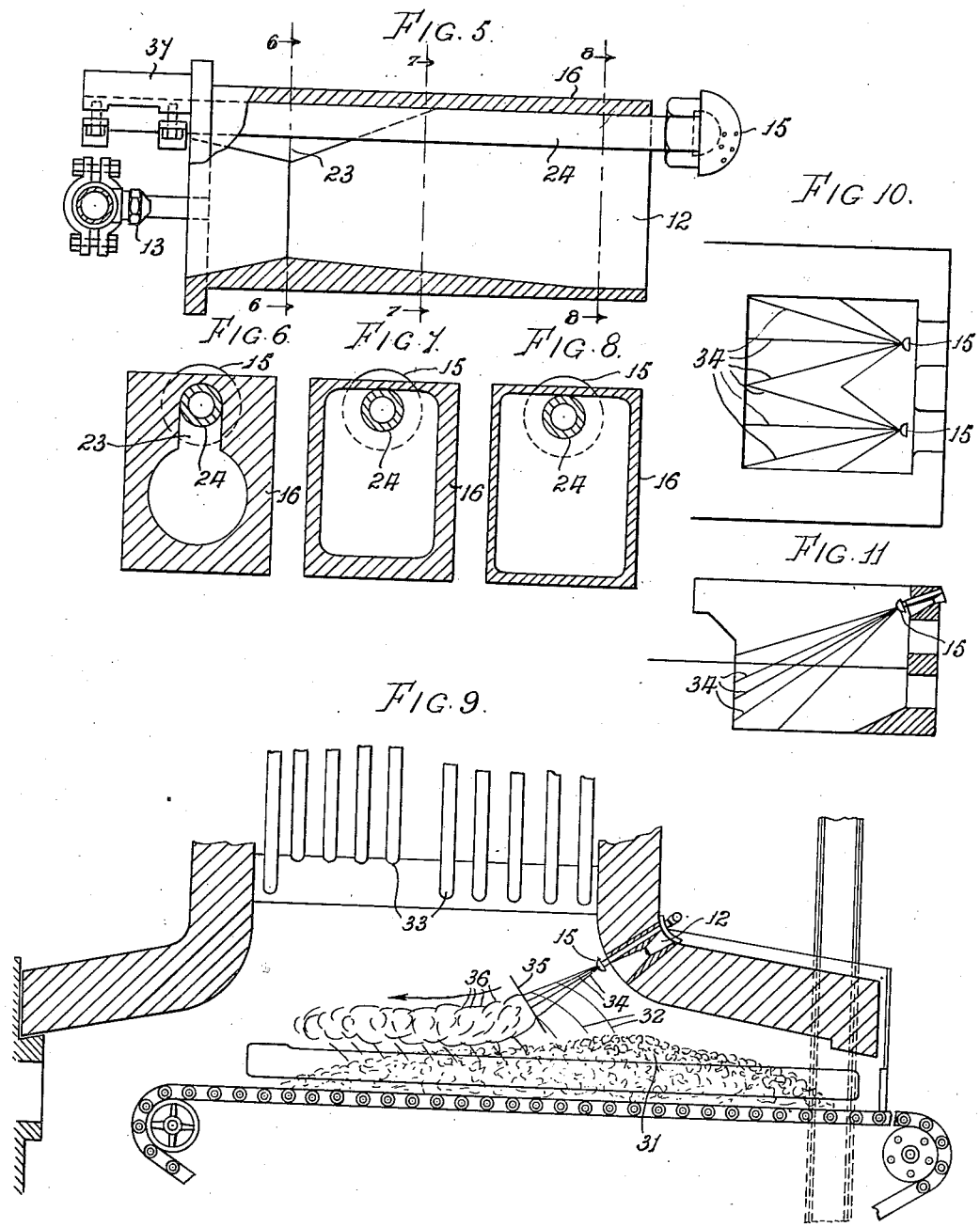

Patented June 29, 1937

2,085,201

UNITED STATES PATENT OFFICE 2,085,201

COMBUSTION CONTROL IN FURNACES

Harold Ashton Richardson, New York, N. Y.

Application October 18, 1934, Serial No. 748,850
In Great Britain May 11, 1934

8 Claims. (Cl. 110—69)

This invention has reference to combustion control in furnaces and relates more particularly to furnaces of the kind used in steam generators.

It is common in furnaces particularly those of the kind referred to, to admit what is known as secondary or top air for the purpose of aiding combustion of the fuel and the products of combustion. This admission of air has not always produced the results required and it is believed that among the reasons for the failures are the low pressure at which it has been admitted, the lack of control after admission and the wrong direction of admission, and the stratification of the cooler secondary or top air and the hot gases of combustion.

Generally the secondary or top air enters the furnace under a natural, forced or induced draught or under a combination of forced and induced, or forced and natural draught and consequently the air enters the furnace at a low pressure, generally less than one pound per square inch and it is not under any control immediately after entering and when in the furnace, consequently it stratifies and drifts with the flow of the gases in the furnace and at best only partially mixes with the products of combustion. While this secondary air may have some influence on the combustion, it does not control the combustion as it is overpowered by the gases and the flow of gases in the furnace is controlled by them.

This invention has for its object to provide improvements in the admission control and distribution of secondary air to a furnace whereby the combustion of the fuel is controlled more adequately and definitely than hitherto.

According to this invention secondary or top air is admitted to a furnace and controlled under sufficient pressure to overcome the draught flow and gaseous currents and other conditions in the furnace, the air on entering the furnace being directed at an angle below the horizontal by a subsidiary high pressure steam or air current above it, whereby it is spread over the incandescent area toward which it is directed.

The invention may be applied in many forms depending on a variety of factors, such as the construction and shape of the furnace, the fuel commonly used, the method of stoking and the means used for providing the necessary air pressure. The actual constructions of apparatus for carrying out the invention will be governed by these and other features so that the installation for one furnace may not be satisfactory for another, which has its own problems and which must be considered in applying the invention.

The invention is more particularly set forth with reference to the accompanying drawings wherein Fig. 1 is a vertical sectional view of a typical control element used for carrying the invention into effect, with part of the support broken away;

Fig. 2 is a top plan view of the structure shown in Fig. 1, with parts of the supply pipes broken away;

Fig. 3 is a back elevational view, the external fittings being removed and with parts of the supply pipes and nozzles broken away;

Fig. 4 is a back elevation of the part in front of the intervening plate;

Fig. 5 is a sectional elevational view of a modified construction;

Figs. 6, 7 and 8 respectively are sectional elevational views taken on the lines 6—6, 7—7 and 8—8 respectively of Fig. 5;

Fig. 9 is a sectional elevational view of part of a boiler furnace stoked by a chain-grate stoker to illustrate the working of the invention;

Fig. 10 is a diagrammatic plan view of a furnace wherein the combustion is controlled according to this invention and having two control elements and Fig. 11 is a sectional elevational view of the structure diagramed in Fig. 10.

A typical embodiment of the invention as applied to a water tube boiler having an underfeed or chain grate stoker, such as that shown in section in Fig. 9 may be considered to comprise a plurality of air openings or nozzles 12 in the front of or near the front of the furnace and above the grate level. These openings or nozzles 12 are directed toward the back of the furnace where there is the greatest incandescence and air at a comparatively low pressure is forced through them. The term "low pressure" means a pressure of less than 5 lbs. per square inch though according to circumstances the pressure may be outside this limit. The means of providing the air and pressure may be any convenient means such as induction by a steam jet from a nozzle 13 in a Venturi pipe 14 or by direct pressure, or by other means according to the supply and power available; probably the steam induction will usually be preferred.

Above the outlet of the opening or nozzle 12 a further nozzle 15 is provided fed with high pressure steam or air—the term "high pressure" means a pressure of from twenty-five to five hundred pounds per square inch, though according to circumstances the pressure may be outside these limits—and this nozzle 15 is conveniently and typically provided with a bulb or hemispherical end having in its face a plurality of holes or jets. These holes or jets are of different sizes and disposition and they are formed and placed in such a manner or design as to pick up the low pressure air entering by the openings or nozzle 12 and to direct the sum of the air issuing, over a definite part of the incandescent area already referred to. For instance some will cause a lateral spread, some a downward spread, some both, but none will be directed upward and all will be directed below the horizontal.

The main air admitted is, as already stated directed more or less downwardly but if air at high pressure such as those mentioned above were to be directed in any quantity on to the fuel it is clear that the air would scour the fuel and blow it away and would disturb the designed conditions of combustion and therefore this main top or secondary air supply enters at low pressure and is controlled and distributed under high pressure. The inclination or direction must not therefore be so extreme or pressure of the air so great as to cause this scouring effect and consequently the direction and pressure of supply to the incandescent area must be one which avoids this possibility and the air must, on reaching the incandescent area glide over and not strike it with any force.

As the low pressure air issues into the combustion chamber by the openings or nozzles 12 it mixes with the hydrocarbons distilled from the green fuel bed such as 31 in Fig. 9 and at once comes under the action of the high pressure directing and spreading jets from the nozzles 15 which split up, and place where desired both the air from the low pressure jets and combustible mixture formed, and break up stratification of gases and cause considerable turbulence in the gases and products of combustion and a liveliness in the fuel bed and in the furnace.

As a result the smoke, grit and other products of combustion in the furnaces which would normally pass up the flues unburnt are involved and controlled by the secondary air, and are directed downward on to the incandescent part of the fuel or furnace towards the back, where the heat is greatest and are thus burned up completely.

In the apparatus shown in Figs. 1, 2, 3, and 4 the openings or nozzles 12 are for convenience made in two parts in the form of castings. The front and larger part 16 is provided with a flange 17 having holes 18 through which bolts 19 pass and which by nuts on the bolts hold the front part 16 tight against the furnace front 20. The back and smaller part 21 has a flange 22 provided with holes through which the bolts 19 pass the part 21 thus being clamped by nuts against the outside of the furnace front 20. The inside of the two parts 16 and 21 are formed in conjunction with a hole through the furnace front 20 to form a Venturi tube for the greater part of the cross sectional area but the strict Venturi formation is broken by the formation of a recess 23 on the top of the parts in which a pipe or tube 24 is housed and held by securing screws 25.

The bolts 19 have pipe clips 26 near their ends and a cover plate 27 at the extremities which plate protects though does not closely cover the end of the part 21, and mounted in the pipe clips 26 so that it can be angularly adjusted is a pipe 28 having a nozzle 13 which by the position of its mounting and adjustment can be directed so that its opening is on the axis of the Venturi tube formed in the opening or nozzle 12. The pipe 28 is connected to a steam or air supply according to convenience so that when blowing into the Venturi tube mouth it will induce a current of air which will be blown from the outlet beyond, but at a low pressure, that is to say a pressure of less than 5 lbs. per square inch.

Mounted in the recess 23 is the pipe or tube 24 at the end of which is a multi-jet nozzle 15 of curved shape such as partly spherical. This nozzle is provided with a plurality of jet openings of various sizes and positions and the sizes and positions are determined by the particular furnace in which the apparatus is to be used.

It will be appreciated by referring to Fig. 9 which merely illustrates a typical use of the invention in connection with an under-feed chain grate stoker boiler furnace that hot gases and products of combustion from the burning fuel 31 will rise, as indicated by the lines 32 and in ordinary circumstances will pass away between the tubes 33 or along a flue.

If air at low pressure is admitted from openings or nozzles 12 directed downwardly, though not necessarily vertically, on to the fire, there will be some mixing of the air for convenience referred to as the "top air", and the furnace gases and products which of course are burning under an ascending draught. As this draught is often of substantial power its tendency will be to sweep the top air away probably as a somewhat cooler layer, very largely unmixed with the gases. To correct this unmixed and stratified condition the nozzles 15 are used, and the nozzles are mounted and the jets are arranged as to position and size, to ensure that the combined issuing air or steam at a high pressure will be directed to the back of the furnace or fuel which is at the highest incandescent state when the furnace is normally working. The theoretical lines 34 of such jets are indicated in Figs. 10 and 11 where it will be seen they are designed to spread in width across the incandescent area as shown in Fig. 10 but also in depth from the back toward the front as shown in Fig. 11. These high pressure jets which are at a pressure of steam or air varying from twenty-five to five hundred pounds per square inch according to requirements in normal circumstances though under special circumstances they may be outside these limits, would have a considerable scouring effect if blown directly onto a bed of fuel but such an effect is not desirable.

Considering Fig. 9 the lines 34 up to the cross line 35 may be considered as issuing lines of the jets from the nozzle 15 which are blowing downward on the top air coming in by the nozzle or opening 12 and while the high pressure jets will depress the top air jet and force it downward there will necessarily be some reaction on the jets 34 in the same way the hot gases and rising currents from the fuel will react on the jets with the result that the furnace gases and currents and the top air and the high pressure jets will become mixed and broken up into a turbulent volume which will be swept in a gliding manner as indicated by the curved lines 36 in the direction of the arrow 37 in Fig. 9 on to the incandescent part of the fuel and furnace and without seriously disturbing the fuel. The result will be that the whole of the combustible mixture whether gaseous or solid will be consumed in the furnace which thus not only gets the benefit of the additional heat from this combustion but also it ensures that nothing but heat passes from the furnace, consequently deposits and smoke are eliminated.

In Figs. 5, 6, 7 and 8 an alternative construction of an apparatus for working under this invention is shown in which the nozzle or inlet 12 is made of rectangular section so that it can more easily be built into the brickwork of a furnace than one of circular shape as shown in Figs. 1, 2, 3, 4 and 9.

In this construction the whole nozzle or outlet is made in a single piece instead of in two parts bolted together. Internally it is of Venturi shape but widens out gently into a rectangular shape internally; at the top is a recess 23 in which the pipe 24 is housed, the pipe being secured at its outer end by a clamp 37 which in the same manner as the screws 25 in the other embodiment illustrated hold the pipe in such a manner that it can easily be released and dropped and drawn out of the nozzle or opening 12.

It may be necessary in certain constructions of furnace to bring the top air in at one side or at the front and to direct the high pressure blast on to it from an opposite point, and such an arrangement may be used with an automatic fuel feed in which the fuel descends in a step-like arrangement or steep incline, as in such a construction it may not be possible to arrange a single or a set of top air inlets and high pressure nozzles in a unit or units and to obtain the necessary angle of drop or descent on to the lowest and most incandescent part of the bed all from one position for each unit.

In the same way the various positions of the high pressure outlets may be varied within wide limits, that is to say they may be directed downwards and also to the sides in a more or less fan shape or they may be directed in a cone or triangle but in all cases they are directed downwards either by their position in the nozzles or by the placing or position of the nozzle itself.

The air control means may be varied so that different pressures are used at different nozzles and further, instead of injecting air at low pressure and distributing it with high pressure air or steam the whole amount of secondary air required for combustion may be forced into and distributed in the furnace by high pressure nozzles only suitably designed, but the intention will always be the same, namely to control the secondary air entering the furnace and mix it with the gases and products of combustion in the furnace and to direct and distribute them under control to the hottest part of the furnace to ensure as far as possible that they will be consumed.

It will be appreciated that by means of this invention a greater heat is available from a given quantity of fuel, as all that is consumable is used and burnt, than is possible at present, high combustion chamber and furnace temperatures are obtained which gives efficient combustion, atmospheric pollution is avoided and flues are kept clean and free from deposits which otherwise would leave the furnace and lodge on their way to the outlet. Such additional heat produced and economies effected much more than compensate for any small percentage of steam or energy in compressed air used in providing the jets.

What I claim as my invention and desire to secure by Letters Patent is:—

1. Apparatus for controlling combustion in furnaces which comprises a tubular passage in the furnace wall, said passage being downwardly directed, a blowing nozzle external to said passage and directed thereinto, fluid under pressure from said nozzle entering said passage and forcing air therethrough under relatively low positive pressure and expelling it downwardly in controlled amounts into the furnace, a second nozzle above at least the major portion of said passage and at the inside end thereof, a high pressure fluid supply to said second nozzle jet openings in said second nozzle disposed and arranged to blow a plurality of high pressure jets downwardly on to the air issuing from said passage and to mix said air with combustible fluid or solid floating in said furnace and to blow the mixture on to an area of high incandescence in the furnace.

2. A method of controlling combustion in furnaces comprising injecting air in controlled amounts into said furnace above the fuel at relatively low positive pressure to ensure mixing between it and the floating and gaseous contents of said furnace without scouring the fuel bed, and injecting a gaseous fluid at a higher pressure, and above the air whereby the injected air is directed down upon the fuel bed and further mixing of the air and the floating and gaseous contents is effected and the whole is directed to an area of high incandescence in the furnace in a gliding action approximately along the line of the resultant of the fluid and gaseous currents in the furnace.

3. Apparatus for controlling combustion in furnaces which comprises a tubular passage in the furnace wall and above the fuel, said passage being of Venturi formation, a recess in said passage and at the top, a tube in said recess, a multi-jet nozzle at the furnace end of said tube, said nozzle having a plurality of jet openings disposed and arranged to blow a plurality of jets downwardly and divergingly, an inducing jet nozzle at the outside end of said passage whereby air is passed through said passage under positive pressure and ejected from its furnace end in controlled amounts, a tube connection to the outside end of said tube in said passage, whereby high pressure fluid is forced from said jet openings downwardly and divergingly on to the gaseous and floating contents of the furnace to effect mixing and to direct said contents on to an area of high incandescence.

4. In a furnace the combination comprising means for supplying air in controlled amounts at positive pressure above the fuel bed, and separate means located above the major portion of said air supplying means for directing a jet of steam or the like downwardly upon the air to distribute it over the fuel bed.

5. In a furnace the combination comprising means for supplying air in controlled amounts at a relatively low positive pressure above the fuel bed, and means located above the major portion of said air supplying means for directing a jet of steam or the like downwardly upon the air at a relatively high pressure to distribute it over the fuel bed.

6. Apparatus for controlling combustion in furnaces which comprises a tubular passage of Venturi formation located in a furnace wall above the fuel bed and directed downwardly to inject air on to the fuel bed at an acute angle, an inducing jet nozzle directed into said passage to direct gaseous fluid into said passage to force air therethrough at relatively low positive pressure, a multi-jet nozzle located in said furnace above the major portion of the inner end of said passage having a plurality of jet openings disposed and arranged to blow a plurality of relatively high pressure jets downwardly and divergingly upon the air issuing from said passage, means to supply gaseous fluid to said inducing jet nozzle, and means to supply gaseous fluid at relatively high pressure to said multi-jet nozzle.

7. Apparatus for controlling combustion in furnaces which comprises a tubular passage of Venturi formation located in a furnace wall above the fuel bed and directed downwardly to inject air on to the fuel bed at an acute angle, a recess in the upper wall of said passage, a tube in said recess extending from end to end thereof, a multi-jet nozzle on the furnace end of said tube located beyond the inner end of said passage and above the major portion thereof, said nozzle having a plurality of jet openings disposed and arranged to blow a plurality of relatively high pressure jets downwardly and divergingly upon air issuing from said passage, an inducing jet nozzle directed into the outer end of said passage to direct gaseous fluid into said passage to force air therethrough at relatively low positive pressure, means to supply gaseous fluid to said inducing jet nozzle, and means to supply steam at relatively high pressure to said tube.

8. Apparatus for controlling combustion in furnaces comprising a Venturi tube adapted to be mounted through the wall of a furnace above the fuel bed and directed downwardly to inject air on to the fuel bed at an acute angle, a tube passageway in at least a portion of the sidewall of said Venturi tube extending longitudinally thereof on the side to be positioned uppermost when said apparatus is mounted in a furnace, a tube in said passageway, a dome-shaped multi-jet nozzle on the furnace end of said last-mentioned tube located beyond the furnace end of said Venturi tube, said nozzle having a plurality of jet openings disposed and arranged below the transverse median line thereof to blow a plurality of relatively high pressure jets downwardly and divergingly upon air which is forced through said Venturi tube, and an inducing jet nozzle mounted at the intake end of said Venturi tube to direct gaseous fluid into said Venturi tube to force air therethrough at relatively low positive pressure.

HAROLD ASHTON RICHARDSON.